United States Patent [19]
Allen et al.

[11] Patent Number: 6,127,875
[45] Date of Patent: Oct. 3, 2000

[54] COMPLIMENTARY DOUBLE PUMPING VOLTAGE BOOST CONVERTER

[75] Inventors: Steven Peter Allen, Mesa; Ahmad H. Atriss, Chandler; Gerald Lee Walcott, Mesa; Walter C. Seelbach, Fountain Hills, all of Ariz.

[73] Assignee: Motorola, Inc., Schaumburg, Ill.

[21] Appl. No.: 09/130,343

[22] Filed: Aug. 13, 1998

[51] Int. Cl.[7] .................................................. H03L 5/00
[52] U.S. Cl. ........................ 327/306; 327/536; 327/537; 327/589
[58] Field of Search .................................... 327/534, 536, 327/530, 537, 390, 306, 331, 589; 365/185.23

[56] References Cited

U.S. PATENT DOCUMENTS

| | | | |
|---|---|---|---|
| 5,644,534 | 7/1997 | Soejima | 365/185.23 |
| 5,889,428 | 3/1999 | Young | 327/536 |
| 5,917,367 | 6/1999 | Woo | 327/537 |

*Primary Examiner*—Tuan T. Lam
*Assistant Examiner*—Hiep Nguyen
*Attorney, Agent, or Firm*—Lanny L. Parker; A. Kate Huffman

[57] ABSTRACT

A voltage boosting circuit which derives an output voltage than is substantially twice the magnitude of a supply voltage applied thereto. The voltage boosting circuit consists of complementary acting boost circuits each having a pair of switches (42A, 52A; 42B, 52B) connected between an input of the voltage boosting circuit, at which is applied the supply voltage, and an output at which the output voltage is produced. Boost capacitors (48A, 48B) are connected between the respective switches of the complementary boost circuits and the switches of the these circuits are opened and closed out of phase with respect to each other in response to clocking signals being applied thereto such that a boosted output voltage is produced during each half cycle of the clocking signals.

3 Claims, 2 Drawing Sheets

COMPLIMENTARY DOUBLE PUMPING VOLTAGE BOOST CONVERTER

BACKGROUND OF THE INVENTION

The present invention relates to voltage boosting converters and, more particularly to a double pumping voltage boosting circuit for providing an output voltage greater than a supplied input voltage and which is suited to be manufactured in integrated circuit form.

The evolution of integrated circuit technology has provided for ever smaller device geometry's with lower operating supply voltages. The lower supply voltage has resulted in advantages and disadvantages with the primary advantage being a significant reduction in power consumption. A significant disadvantage is the inability of some of the more complex functions to operate at the lower supply voltage. To facilitate these functions, a localized voltage boosting circuit is needed to supply an increased operating voltage. The voltage boosting circuit should be efficient in terms of power consumption, component count and die area while delivering an increased supply voltage with minimal amounts of ripple or distortion.

A basic voltage boosting circuit 10, that is well understood in the art, is illustrated in FIGS. 1, 2, and 2A. Circuit 10 uses two switches 12 and 24 for controlling the current flow and two capacitors 18 and 28 for boosting and storing an output voltage applied across a load resistor 30 which is derived from a supply voltage $V_{DD}$ supplied at an input 14. The circuit operation begins by first referencing the boosting capacitor 18 to the supply voltage and ground reference potential by having switch 12 closed during the first half cycle, $\eta_1$, in response to a pair of non-overlapping clock signals C1 and C2, which are 180 degrees out of phase with respect to one another, while the output of buffer 20 is in a low voltage level state due to a boost signal applied thereto. This connects the top of capacitor 18 to $V_{DD}$ while the bottom is at ground reference potential. In the second half cycle, $\Theta_2$, switch 12 opens and buffer driver output drives from a low voltage level state to a high voltage level state boosting the potential at the top of capacitor 18 to substantially twice the supply voltage $V_{DD}$. Simultaneously, switch 24 closes so that the boosted charge on capacitor 18 can be distributed between itself and storing load capacitor 28. The resulting output voltage $V_R$, depicted in FIG. 2, shows the boosted voltage on capacitor 28 decaying as current is delivered in the load $R_L$, during the first half of the clock cycle, $\Theta_1$. During the second half of the clock cycle, $\Theta_2$, the output voltage first builds toward $2V_{DD}$, due to the boosted charge on capacitor 18 being redistributed across capacitors 18 and 28, and then decays as current is delivered to the load. The resulting output voltage contains a significant amount of distortion due to the discrete charge and decay times. Furthermore, it typically takes 1600 pF of capacitance for both capacitors to deliver 1.2 ma of current while boosting the voltage from 0.9 volts to 1.4 volts, at a 10 MHz clock rate.

Hence, a need exists for an improved voltage boosting circuit suitable for fabrication in integrated circuit form for boosting a supply voltage while requiring less capacitance and output voltage distortion than known prior art voltage boosting circuits.

DETAILED DESCRIPTION OF THE PREFERRED EMBODIMENTS

Figure 1:
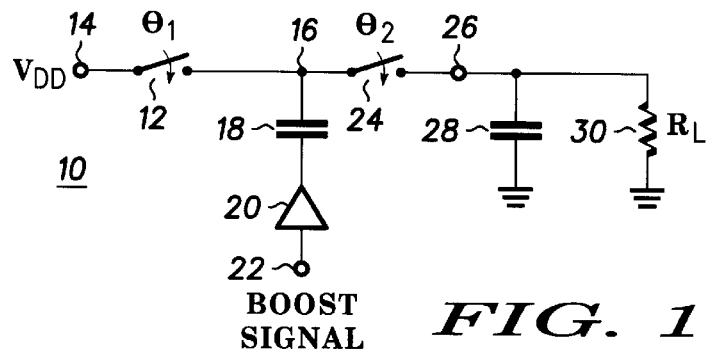
FIG. 1 is a schematic diagram of a prior art voltage boosting circuit.
Figure 3:
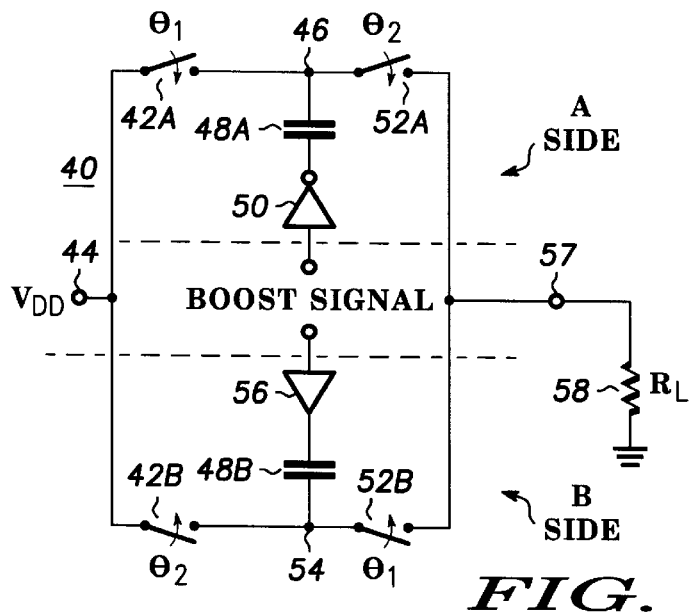
FIG. 3 is a schematic diagram of one embodiment of the present invention.
Figure 2A:
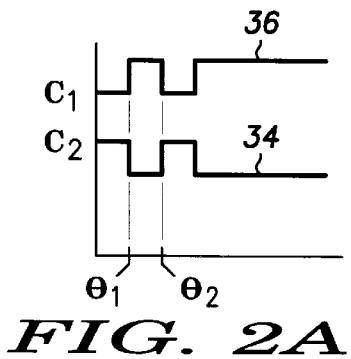
FIG. 2A shows the clocking signals useful for explaining the operation of the present invention.
Figure 2:
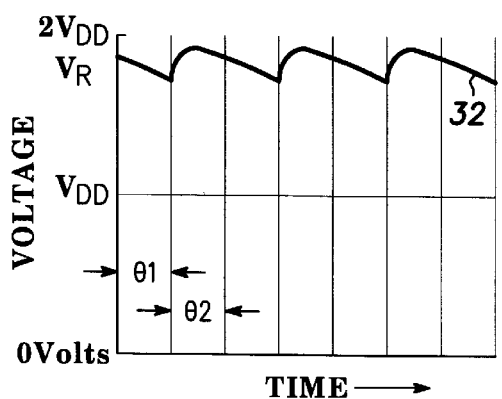
FIG. 2 shows the output voltage produced by the prior art circuit of FIG. 1.

Turning now to FIG. 3 there is shown double pumping voltage boosting converter 40 of the preferred embodiment of the present invention. Voltage boosting circuit 40 comprises an A side voltage boost circuit portion similar to the prior art circuit of FIG. 1 and a complementary (B side) voltage boost circuit portion. Thus, the complementary pumping architecture of FIG. 3 includes first switches 42A and 42B connecting a supply voltage $V_{DD}$, applied to terminal 44, to respective terminals 46 and 54 when the switches are closed and disconnecting terminal 44 from terminals 46 and 54 when opened. The A side circuit portion further includes capacitive device 48A connected between terminal 46 and the output of inverting buffer driver 50. Likewise, B side circuit portion includes capacitive device 48B coupled between terminal 54 and non-inverting buffer driver 56. Terminals 46 and 54 are coupled respectively via a pair of switches 52A and 52B to output 57 of voltage boosting circuit 40 which is, in turn, connected to load device 58, shown here as a resistor $R_L$. A voltage boost signal is applied to the inputs of buffer drivers 50 and 56.

Figure 4:
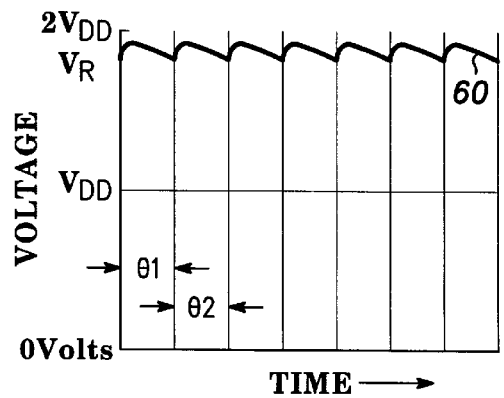
FIG. 4 shows the output voltage produced by the embodiment of the present invention.

Thus, in operation, during the first half cycle, $\Theta_1$, of the clocking signals 34 and 36, switches 42A and 52B are closed while switches 42B and 52A are opened. If it is assumed that the capacitive device 48B has been charged to $V_{DD}$ during a previous half cycle, and at the same time switch 52B is closed, the boost signal is in a high level state, as previously described, the voltage across capacitive device 48B will be boosted to nearly $2V_{DD}$ as illustrated in FIG. 4, to drive into load 58. As current flows in load 58 the charge across capacitive device 56 begins to decrease but to a much less degree than for prior art circuit 10. Simultaneously, the boost signal applied to inverting buffer 50 is driving its output to a low level state, is referencing capacitive device 48A between $V_{DD}$ and ground potential as switch 42A is closed while terminals 46 and 54 are disconnected from output terminal 57 and input terminal 44 respectively as the switches are open. Thus, as capacitive device 48B is delivering the boosted voltage into load 58, capacitive device 48A is being charged to $V_{DD}$. Conversely, during the second half cycle, $\Theta_2$, switches 42B and 52A are closed while switches 42A and 52B are opened. Boost signal also changes states from a high level to a low level. Hence, the A side of voltage boosting circuit 40 drives load 58 with a voltage nearly equal to $2V_{DD}$ as the voltage across capacitive device 48A is boosted to the higher voltage level while $V_{DD}$ is applied across capacitive device 48B. Thus, during initiation of both half cycles $\Theta_1$ and $\Theta_2$, as illustrated in FIG. 4, the voltage drive into load 58 is raised to nearly $2V_{DD}$.

The output voltage $V_R$, wave form 60, is shown to have much less distortion as boost capacitors 48A and 48B deliver charge into load 58 during both phases of the clocking pulses which reducing the discharge time that $V_R$ decreases which is a significant advantage over the prior art. Additionally, the need for an added load capacitance, capacitor 28, is eliminated by voltage boosting circuit 40 since either capacitive device 48A or capacitive device 48B is driving load 58 at all times. Hence, not only is the need for one capacitive device eliminated by the present invention but the individual capacitance value of the two driving capacitive devices thereof are significantly reduced. Therefore, the die area needed for fabricating voltage boosting circuit 40 in integrated circuit form compared to circuit 10 is significantly reduced.

In one example, a voltage boosting circuit of the present architecture has been found to use 400 pF of capacitance for capacitive devices 48A and 48B to deliver 1.2 ma of current to a load while boosting the voltage applied thereto from 0.9 volts to 1.4 volts, at a 10 Mhz clock rate while reducing the output voltage distortion when compared to the voltage boost circuit of the prior art. The prior art boost circuit required 3200 pF of capacitance to achieve the same performance. This represents a significant savings in die area.

Figure 5:
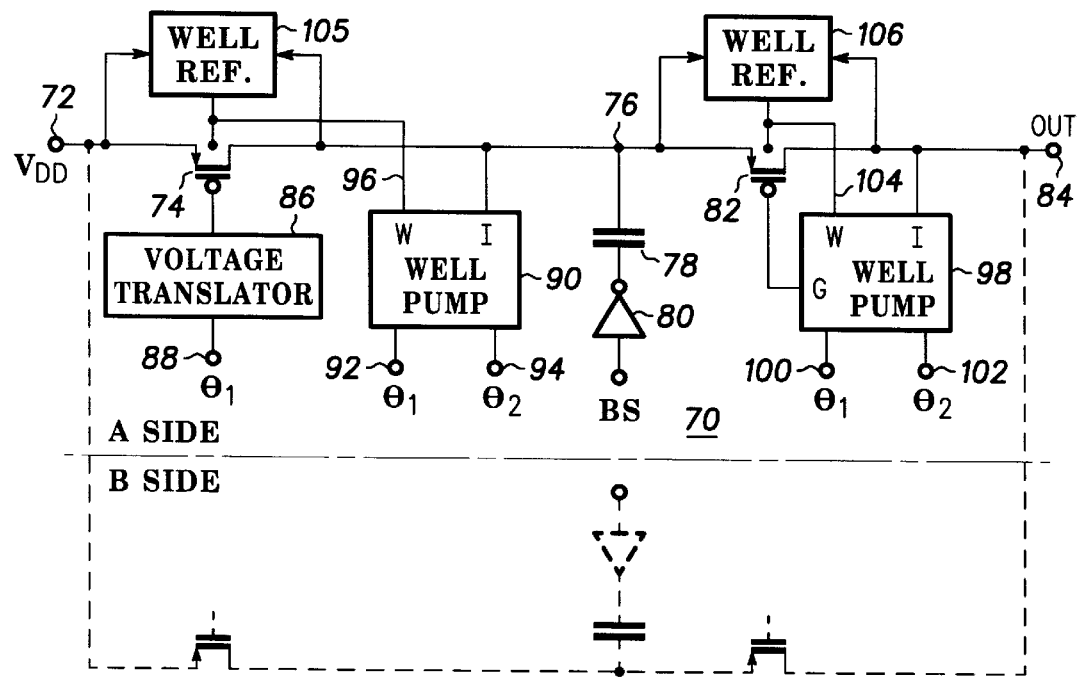
FIG. 5 is a partial block and schematic diagram of the voltage boosting circuit of the present invention shown in FIG. 3.

Turning now to the remaining figures, the voltage boosting circuit architecture of the present invention is shown in more detail. For brevity, FIG. 5 illustrates only the A side portion 70 of the voltage boosting circuit 40 described in FIG. 3, it being understood that the B side portion is identical thereto.

Switches 42A, 52A (as well as 42B and 52B) are illustrated as being realized by PMOS transistors. PMOS transistor 74, switch 42A, is shown as having its source electrode coupled to input 72 to which is applied supply voltage while its drain is coupled to terminal 76 at one side of capacitor 78. The other side of capacitor 78 is coupled to the output of inverting buffer driver 80 the latter of which has an input to which the boost signal is applied. Switch 52A is shown as being realized by PMOS transistor 82 having its source electrode coupled to terminal 76 and its drain electrode coupled to output 84. Output 84 would be connected a to load which, not shown, would be similar to load 58 of FIG. 3. A voltage translator 86 which has an input 88 for receiving the clock pulse C1 provides a translated voltage, as is understood to those skilled in the art, to drive the gate electrode of transistor 74 such that the gate potential is of sufficient magnitude to insure that the transistor remains off whenever its gate is driven high. Similarly, a voltage translator is provided, as will be discussed, for driving the gate electrode of transistor 82 in a complementary phase with respect to transistor 74. All translators receive their supply voltage from the converter output, node 84.

The switch transistors 74 and 82, as well as the corresponding switch transistors (shown in phantom) of the B side portion of the voltage boosting circuit 40, are floating well P-channel transistors who's well biasing is driven by pumping structures 90 and 98 respectively. The well pumping structures provide a continuous boosting drive at the W outputs thereof to each floating well of the switch transistors during every phase $\Theta_1$ and $\Theta_2$ of the clocking signals C1 and C2 applied at the inputs (92, 94; 100, 102) so that the well is quickly boosted and maintained at a higher potential than the source or drain of the switch transistor. This is critical in preventing charge injection, particularly during start up of voltage boosting circuit 40. In addition, clamping circuits or well reference circuits 105 and 106, which are coupled between the drain and source of transistors 74 and 82, prevent the wells of these floating well transistors from being boosted to too high of a potential at which gain degradation due to body effect may occur.

Figure 6:
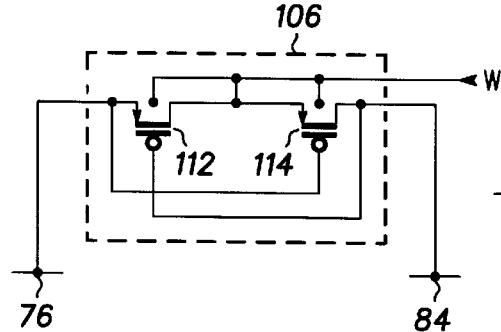
FIG. 6 is a schematic diagram of the well reference circuit shown in FIG. 5.

Turning to FIG. 6, the clamping circuit 106 will be described, it being understood that clamping circuit 105 is substantially identical therewith. Clamping circuit 106 is illustrated as including a pair of floating well PMOS transistors 112 and 114 the floating wells of which are coupled to the well driving output of well pump 98. The source electrode of transistor 112 is coupled at terminal 76 while its gate electrode is coupled with the drain electrode of transistor 114 at output 84. Transistor 114 has its source electrode coupled to the drain electrode of transistor 112 and to the interconnected wells of the two transistors while its gate electrode is coupled at the source electrode of transistor 112 at terminal 76. Clamping circuit 106 references the well potential of transistor 82 to within one threshold of the highest potential at either its source or drain. At start up, where the output voltage at node 84 is low and the voltage at the top of boost capacitor 78 is high, during the boost cycle, transistor 112 turns on whenever the potential of the well of transistor 82 exceeds the potential on capacitor 78 at node 76. Conversely, when the output voltage at output 84 is high and boost capacitor 78 is driven low, transistor 114 turns on whenever well of transistor 82 exceeds one threshold of the output voltage. As a result, clamping circuit 106 or 105 keeps the well of the switch transistors 74 and 82 closely coupled to the highest potential of there surrounding nodes so that the highest possible gain of the respective switch transistor can be achieved without the possibility of incurring charge injection.

Figure 7:
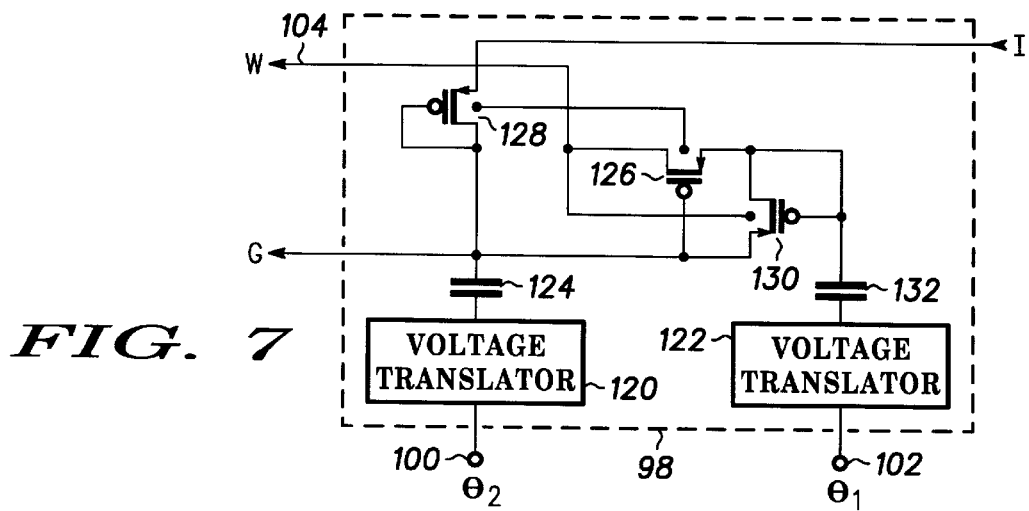
FIG. 7 is a schematic diagram illustrating a well pump circuit disclosed in FIG. 5.

Turning now to FIG. 7, well pumping circuit 98 will be described which provides a continuous boost drive to the well of switch transistor 82. As shown, the pair of clocking signals (FIG. 1A) are supplied to respective inputs 100 and 102 which drive voltage translators 120 and 122. The outputs of the voltage translators 120 and 122 are coupled to the bottoms respectively of capacitors 124 and 132. As illustrated, an output of voltage translator 120 is coupled through capacitor 124 to drive the gate of transistor 82. Continuing, the top side of capacitor 124 is also coupled to the drain of transistor 128 the source of which is coupled to node 84 while its gate is connected to the drain thereof. The top side of capacitor 132 is connected to both the gate and drain of transistor 130 while the source of transistor 130 is connected both to the gate of transistor 126 and the top side of capacitor 124. Transistor 126 is further shown as having its source connected to the drain of transistor 130 while its drain is connected to the floating well of switch transistor 82 and to the well of transistor 130. Transistor 134 has its gate connected to its drain and to node 84. The only difference between well pump circuit 98 and 90 is that the former has an output G connected to the gate of its related switch transistor while the latter does not since the gate of its related switch transistor 74 is driven directly by a separate voltage translator, 86.

The well pumps 90 and 98 work by first having capacitor 124 being driven high from translator 120 for driving the gate of transistor 126 while capacitor 132 is driven low by translator 122. Transistor 126 will thus be turned off while transistor 130 is turned on. This results in the potential at the top of capacitor 132 being driven to a voltage threshold below the potential at the top of capacitor 124. Clock signals C1 and C2 then change phase during the next half cycle of operation resulting in capacitor 124 being driven low while capacitor 132 is driven high. Transistor 126 will thus be turned on while transistor 130 is turned off. With transistor 126 now on, the increased potential at the top of capacitor 132 is transferred across the source and drain of transistor 126 to the well of the respective switch transistor that is connected to the output W of the well pump circuit.

Hence, what has been described is a novel improved voltage boosting circuit for providing an output voltage that is substantially twice the magnitude of a supply voltage applied thereto. For localized voltage boosting the voltage boosting circuit disclosed herein provides maximum voltage boosting while requiring less total circuit capacitance and less output distortion than equivalent prior circuits.

What is claimed is:

1. A boost circuit having an input terminal and an output terminal, comprising:
   - a first switch coupled between the input terminal and the output terminal and operated by a first phase signal;
   - a second switch coupled between the input terminal and the output terminal and operated by a second phase signal that is opposite to the first phase signal;
   - a first capacitor having a first terminal coupled to the output terminal and a second terminal coupled for receiving a boost signal; and
   - a second capacitor having a first terminal coupled to the output terminal and a second terminal coupled for receiving the boost signal.

2. The boost circuit of claim 1, further including:
   - an inverting buffer having an input coupled for receiving the boost signal and an output coupled to the second terminal of the first capacitor; and
   - a non-inverting buffer having an input coupled for receiving the boost signal and an output coupled to the second terminal of the second capacitor.

3. The boost circuit of claim 1, further including:
   - a third switch coupled between the first terminal of the first capacitor and the output terminal, and operated by the second phase signal; and
   - a fourth switch coupled between the first terminal of the second capacitor and the output terminal, and operated by the first phase signal.

* * * * *